Patented Oct. 9, 1951

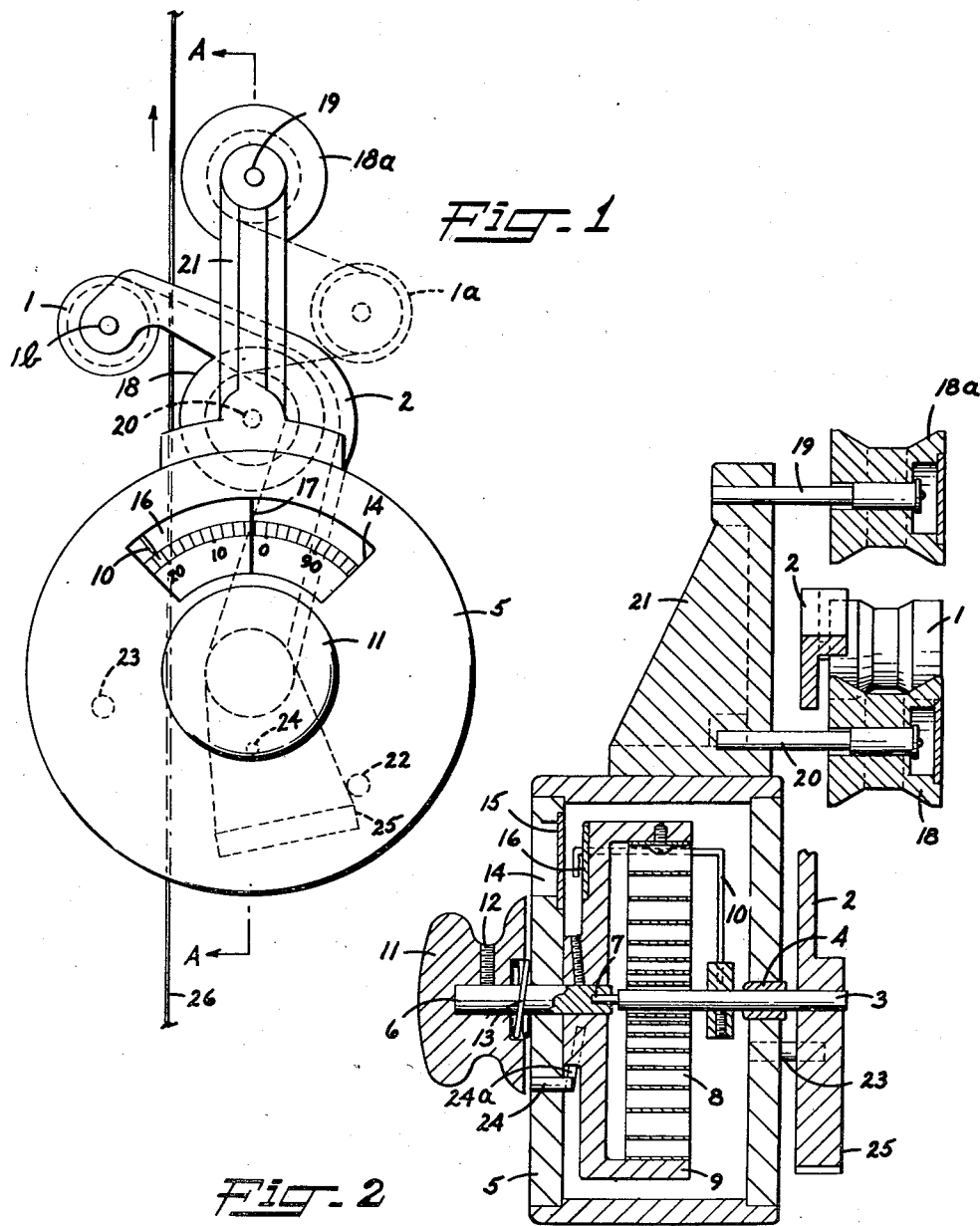

2,570,486

UNITED STATES PATENT OFFICE 2,570,486

DEFLECTION TENSIOMETER

Ingham S. Roberts, Ridley Park, Pa., assignor to American Viscose Corporation, Wilmington, Del., a corporation of Delaware Application February 12, 1947, Serial No. 728,097

7 Claims. (Cl. 73—144)

This invention relates to tension measuring devices, and relates more particularly to devices for measuring the tension in running yarns, threads, filaments or the like.

It is often desirable in textile operations to ascertain the tension in running yarns, threads, filaments or the like. Some tensiometers as shown in the prior art are so arranged that the tension in the yarn displaces a roller from a zero position and thereby deflects a spring. The amount of this deflection is indicated on a dial as a measure of the tension. As a matter of design, the permissible displacement of the roller is in the order of 20° maximum—and the deflection must therefore be magnified by gearing to provide full deflection of the pointer around the dial, unless the dial is to be confined to a 20° arc. For the accurate measurement of light or moderate tensions, these instruments have several disadvantages, i. e., the power required to operate the gearing causes an error which becomes large when the gearing is dirty or corroded; wear in the gearing constitutes an error; the instrument must be held in the position for which it was calibrated or the off-balance weight of the roller arm causes an error and, lastly, the small amount of spring deflections makes the errors due to machining tolerances proportionately more important.

Another disadvantage of the prior art is that their working parts are not protected from the acids used in artificial filament spinning and become clogged with salts. These disadvantages of the prior art are overcome by the use of the present invention.

The primary object of the present invention is to provide a device which will give accurate indications of the tension in light denier yarns between the lower and upper godets on artificial filament spinning machines and between the upper godet and the spinning bucket.

Another object of the present invention is to provide a means for protecting the working parts of the tensiometer from the corrosive and clogging action of acids and salts, as used in the artificial filament spinning industry.

Other objects and advantages of the present invention will become more apparent from the following drawings and description hereinafter.

In the drawings:

Figure 1 is a front elevation of a preferred embodiment of the present invention.

Figure 2 is a side elevation in section taken along section lines A—A in Figure 1.

As shown in Figures 1 and 2 reference character 1 represents a grooved roller mounted on a pivot arm 2 which is secured to one end of the spring shaft 3. The shaft 3 is rotatably mounted and supported in the bearing 4 which is mounted in the housing 5. It is to be understood that the bearing may be of the journal type, roller or needle type without departing from the scope of the invention as shown or described herein. A counter-weight 25 on the arm 2 gives the arm 2 a condition of static balance about shaft 3 to any angle to which it is rotated.

On the opposite end of the spring shaft 3 a small extension 7 of the shaft engages a recess in the inner end of the indicator shaft 6 with an easy running fit. Fixedly secured to the end of the spring shaft 3 near the extension 7 is a flat spiral spring 8. The outer turn of the spring 8 is attached to the inside of a cup-like indicator disc 9 which is fixedly secured to the indicator shaft 6. Fixedly secured to the spring shaft 3 and movable therewith is an indicating member 10 that is used to point to the indicia on the scale 16 secured to the indicating disc 9.

A knob 11 is mounted on the external end of the indicator shaft 6 as a means for turning the same. This knob is secured to the shaft 6 by a set screw 12 or the like. A compression spring 13 maintains contact between the indicating disc 9 and the housing 5 for frictional holding and for sealing. Suitably located above the knob 11 in the housing 5 is an opening 14 in which a transparent member 15 is secured. This transparent member 15 gives visibility to the scale 16. The instrument is calibrated by operating it with a strand by which a plurality of known tensions may be applied to the instrument. With roll 1 in a predetermined position 1a relative to rolls 18 and 18a, consecutive readings on dial 16 are taken with the strand under a given tension proceeding in both directions through the instrument to average out the friction in rolls 18 and 18a. A radial line 17 is inscribed on the transparent member 15 to indicate when the pointer 10—and therefore the arm 2 and roller 1—is at the determined position for which the instrument was calibrated.

Two thread guide members 18a and 18 are rotatably mounted on shafts 19 and 20 respectively. The shafts 19 and 20 are mounted parallel to the spring shaft 3 in the supporting member 21 that is integrally attached to the housing 5. However it is to be understood that the shafts 19 and 20 may be attached at any angle to the supporting member 21, so long as they are substantially parallel to one another and are parallel to the shaft 3 and the shaft 1b to which the roller 1 is secured.

The stops 22 and 23 limit the rotation of the balanced pivot arm 2. In a like manner the stop 24 limits the rotation of the indicator disc 9 to about 360° unless a twice around or three times around scale is desired in order to obtain higher readings. In this case the pin 24a which strikes the stop 24 is removed to increase the angular translation.

In operation, the instrument is held in one hand while the knob 11 is turned with the other. The arm 2 is first rotated counter-clockwise to the position shown in Figure 1 by pressing on the counterweighted portion of the arm 2 and the instrument is placed so that the strand passes between the rollers as shown. The knob 11 is then turned clockwise, increasing the torque in the spring 8 until it overcomes the tension in the strand and forces the roller 1, and the strand to pass between rollers 18 and 18a to reach the position shown in 1a—as indicated by the coincidence of the pointer 10 with the radial line 17. The deflection of the spring at this balance point, or, as calibrated, the corresponding tension in the strand is then indicated by the position of the scale 16 relative to the line 17.

The deflection of the spring of the new tensiometer is 360° (or 720° if a twice around scale is used) and the power required to operate the internal mechanism is negligible—only being that necessary to overcome the friction in the bearings of the spring shaft 3. The sensitivity of its operation and the accuracy of its indications are therefore the maximum attainable. The effect of bearing friction on the shaft 3 is minimized by the long moment arm of the pivoted roller. Since the pivot arm is statically balanced the position in which the instrument is held is immaterial. The case, which is made of bakelite or the like, is sufficiently tight so that the instrument may be washed under a faucet after being used on acid strands. The greatest advantage that the present invention has over the prior art is that it is readily adaptable for accurately measuring tensions between zero and ten grams.

Although this invention has been described with reference to improvements shown, it will readily be appreciated that numerous changes may be made without departing from the spirit and scope of the invention as described in the appended claims.

I claim:

1. A tensiometer for measuring the tension in a strand comprising supporting means, two thread guiding means supported rotatably thereon about spaced parallel axes, a shaft parallel to said axes and rotatably mounted in said supporting means, an arm fixed on the shaft and having thread guiding means on its outer end, means carried by the supporting means for indicating at least one determined position of the latter thread guiding means relative to the two former thread guiding means, a second shaft carried by the supporting means coaxially related to the first shaft, means for rotating said second shaft, spring means connecting the second shaft to the first shaft, and means for indicating the deflection of the spring resulting from a relative rotation of the shafts from a normal position of rest.

2. A tensiometer for measuring the tension in a strand comprising supporting means, two thread guiding means supported rotatably thereon, a shaft rotatably mounted on the supporting means, an arm fixed on the shaft and having thread guiding means on its outer end, an indicator disc secured to a second rotatable shaft carried by the supporting means, spring means secured to the first shaft and the indicator disc for resiliently interconnecting them, a pointer secured to the first shaft and extending into overlapping relationship with respect to a scale on the indicator disc, and means for rotating the second shaft relative to the first shaft from a normal position of rest.

3. A tensiometer for measuring the tension in a strand comprising a housing, two thread guiding means supported thereon, a pivoted member having a thread guiding means on one of its extremities, said pivoted member being secured to a rotatable spring shaft which extends into the housing, an indicator disc secured to an indicator shaft which extends into the housing from the opposite side and on a centerline common to the rotatable spring shaft, a flat spiral spring secured at its outer periphery to the indicator disc and at its center to the spring shaft, a pointer secured to said spring shaft and extending into overlapping relationship with respect to a scale on the indicator disc, and means for rotating the indicator shaft relative to the spring shaft from a normal position of rest.

4. A tensiometer for measuring the tension in a strand comprising a housing, two thread guiding means supported thereon, a pivoted member having a thread guiding means on one of its extremities, said pivoted member being secured to a rotatable spring shaft which extends into the housing, an indicator disc secured to an indicator shaft which extends into the housing from the opposite side and on a centerline common to the rotatable spring shaft, the indicator disc being attached to the outer periphery of a flat spiral spring which is secured at its center to the spring shaft, a pointer secured to said spring shaft and extending into overlapping relationship with respect to a scale on the indicator disc, a knob for rotating the indicator shaft relative to the spring shaft from a normal position of rest, and resilient means for maintaining contact between the indicator disc and the housing for frictional holding and for sealing.

5. A tensiometer for measuring the tension in a strand comprising a housing, two thread guiding means supported thereon, a pivoted member having a thread guiding means on one of its extremities, said pivoted member being secured to a rotatable spring shaft which extends into the housing, an indicator disc secured to an indicator shaft which extends into the housing from the opposite side and on a centerline common to the rotatable spring shaft, the indicator disc being attached to the outer periphery of a flat spiral spring which is secured at its center to the spring shaft, a pointer secured to said spring shaft and extending into overlapping relationship with respect to a scale on the indicator disc, a knob for rotating the indicator shaft relative to the spring shaft from a normal position of rest, and a helical spring located between the knob and the housing for maintaining contact between the indicator disc and the housing for frictional holding and for sealing.

6. A tensiometer for measuring the tension in a strand comprising a housing, two thread guiding rollers supported thereon, a rotatable shaft extending into the housing, an arm secured to the shaft and having a thread guiding roller on its outer end, an indicator disc secured to a second rotatable shaft which extends into the housing from the opposite side and on a centerline common to the first rotatable shaft, a flat spiral spring secured at its outer periphery to the indicator disc and at its center to the first shaft, a pointer secured to the first shaft and extending into overlapping relationship with respect to a scale on the indicator disc, a knob for rotating the second shaft relative to the first shaft from a normal position of rest, and a helical spring located between the knob and the housing for maintaining contact between the indicator disc and the housing for frictional holding and for sealing.

7. A tensiometer for measuring the tension in a strand comprising a housing, two parallel thread guiding rollers supported thereon, a balanced pivoted member having mounted on one of its extremities parallel to the first two rollers a thread guiding roller which contacts the thread when the balanced pivoted member rotates and causes the strand to contact each of the parallel thread guiding rollers, said pivoted member being secured to a rotatable spring shaft which extends into the housing, an indicator disc secured to an indicator shaft which extends into the housing from the opposite side and on a centerline common to the rotatable spring shaft, the indicator disc being attached to the outer periphery of a flat spiral spring which is secured at its center to the spring shaft, a pointer secured to said spring shaft and extending into overlapping relationship with respect to a scale on the indicator disc, a knob for rotating the indicator shaft relative to the spring shaft from a normal position of rest, and a helical spring located between the knob and the housing for maintaining contact between the indicator disc and the housing for frictional holding and for sealing.

INGHAM S. ROBERTS.

REFERENCES CITED

The following references are of record in the file of this patent:

UNITED STATES PATENTS

| Number | Name | Date |
|---|---|---|
| 272,699 | Ide | Feb. 20, 1883 |
| 1,647,287 | Floyd | Nov. 1, 1927 |
| 2,013,938 | Williams | Sept. 10, 1935 |
| 2,352,906 | Lyons | July 4, 1944 |
| 2,428,379 | Naumann | Oct. 7, 1947 |